(12) United States Patent
Takedomi et al.

(10) Patent No.: US 6,583,527 B2
(45) Date of Patent: Jun. 24, 2003

(54) LINEAR MOTOR AND APPARATUS AND METHOD FOR PROTECTING IT

(75) Inventors: Seiki Takedomi, Saitama-ken (JP); Hiroshi Hashimoto, Sitama-ken (JP)

(73) Assignees: Hitachi Metals, Ltd., Tokyo (JP); Hitachi Metals Kiko, Ltd., Gunma-Ken (JP)

( * ) Notice: Subject to any disclaimer, the term of this patent is extended or adjusted under 35 U.S.C. 154(b) by 0 days.

(21) Appl. No.: 10/143,852

(22) Filed: May 14, 2002

(65) Prior Publication Data

US 2002/0195889 A1 Dec. 26, 2002

(30) Foreign Application Priority Data

May 15, 2001 (JP) ........................................ 2001-145139

(51) Int. Cl.$^7$ .......................... H02H 7/085; H02K 41/02
(52) U.S. Cl. ........................ 310/68 C; 310/12; 318/135; 361/31
(58) Field of Search ................................ 310/68 C, 12; 318/135; 361/31, 23, 24, 25, 30, 32

(56) References Cited

U.S. PATENT DOCUMENTS 4,623,967 A * 11/1986 Naimer ........................ 700/295
5,136,217 A * 8/1992 Hoffmann et al. ........... 318/135

FOREIGN PATENT DOCUMENTS

| JP | 55-83454 | 6/1980 | | |
|---|---|---|---|---|
| JP | 59-89517 | 5/1984 | | |
| JP | 63-209420 | 8/1988 | | |
| JP | 4-67763 | 3/1992 | | |
| JP | 63-93783 U | 4/1998 | | |
| JP | 11-98809 | * 4/1999 | .......... | H02K/41/02 |
| JP | 2000-308389 | 11/2000 | | |

* cited by examiner

Primary Examiner—Burton S. Mullins
(74) Attorney, Agent, or Firm—Morgan, Lewis & Bockius LLP

(57) ABSTRACT

An apparatus for protecting a linear motor having a structure in which permanent magnets and a coil are subjected to relative movement, comprising (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, and (g) an overload-preventing means receiving said overload signal for controlling a driving means of said coil, thereby protecting said coil.

6 Claims, 5 Drawing Sheets

LINEAR MOTOR AND APPARATUS AND METHOD FOR PROTECTING IT

FIELD OF THE INVENTION

The present invention relates to a linear motor having a structure in which permanent magnets and a coil are subjected to relative movement, and an apparatus and a method for protecting such a linear motor.

BACKGROUND OF THE INVENTION

Movable coil-type linear motors have conventionally been widely used as driving means for positioning articles in stroke ranges of about 10–100 cm (for instance, Japanese Patent Publication No. 58-49100 and Japanese Utility Model Laid-Open No. 63-93783). The movable coil-type linear motor comprises a plurality of permanent magnets magnetized in their thickness directions and arranged such that their different magnetic poles are opposing each other, and a movable coil assembly moving in a magnetic gap defined between the opposing permanent magnets (or between permanent magnets and a yoke) in perpendicular to a magnetic flux.

Such a linear motor is free from a center yoke in a magnetic circuit portion, and comprises a plurality of closed-loop magnetic fluxes in the magnetic gap, so that a magnetic flux is not concentrated in part of the magnetic path. Accordingly, this linear motor can generate a uniform magnetic flux density in an overall range of a long stroke.

FIG. 5 schematically shows one example of a mechanical portion of the linear motor, in which permanent magnets and a coil are subjected to relative movement. This linear motor comprises a pair of flat plate-shaped yokes 1, 1 made of ferromagnetic materials such as soft iron, a pair of permanent magnet rows 102, 102 constituted by a plurality of permanent magnets 2 magnetized in their thickness directions, and attached to the inner surface of the flat plate-shaped yokes 1, 1 respectively, such that they are opposing via a magnetic gap 3, and supports 4, 4 attached to both ends of a pair of yokes 1, 1 to provide the magnetic gap 3. In each permanent magnet row 102, the permanent magnets 2 are arranged on each yoke 1, 1 in a longitudinal direction, such that N poles and S poles alternately appear on the surfaces of the permanent magnets 2, and that different magnetic poles appear on the surfaces of the permanent magnets 2 opposing via the magnetic gap 3. A plurality of closed-loop magnetic circuits are constituted by a pair of yokes 1, 1 and a pair of opposing permanent magnets 2, 2 (refer to FIG. 5). Incidentally, the supports 4 are preferably formed by the same ferromagnetic materials as those of the yokes 1.

FIG. 6 schematically shows another example of the linear motor. This linear motor comprises a plurality of permanent magnets 2 arranged on one yoke 1 to constitute magnetic circuits, instead of having a structure that the different poles of a plurality of permanent magnets 2 are opposing via the magnetic gap 3.

FIGS. 5 and 6 respectively show movable coil-type, linear motors, both of which are essentially the same except for difference in that the number of the combination of a permanent magnet row 102 and a yoke 1 is two or one. Because the linear motor of FIG. 5 has a larger magnetic flux density at the same current level, it provides a larger thrust.

The coil 5 is constituted by flat multi-phase coils with the winding direction of the coil 5 in perpendicular to a magnetic flux direction in a magnetic gap 3. A plurality of coils 5 (only one coil is shown for simplicity) are arranged longitudinally along the permanent magnet row 102, and the directions of their magnetic poles are detected to switch a coil to which current is supplied and the direction of current by a means such as a magnetic field detecting element, etc.

In the movable coil-type linear motor, a plurality of coils 5 are arranged in a stroke direction to generate a large thrust. A plurality of coils 5 are integrally fixed to a non-magnetic holder (not shown) to constitute a mover. The mover is movably supported by a sliding member (not shown) in a longitudinal direction of a permanent magnet row 102, and the holder is integrally fixed to a table (carriage) on which an article is placed. The holder is made of non-magnetic materials such as resins, aluminum, ceramics, etc. so as not to provide magnetic influence on a closed-loop magnetic circuit. To make the magnetic gap 3 as small as possible, the holder is preferably as thin as possible.

In order that the coil 5 receives thrust to move in a constant direction, the direction of current should be changed successively according to the polarity of the opposing permanent magnets 2. When the coil 5 faces a boundary of the adjacent permanent magnets 2, 2, there is no thrust of movement. Current supply is thus stopped to the coil 5. The holder is equipped with one element (usually Hall element) for detecting the polarity of the permanent magnets 2 per one phase of the coil. Accordingly, in the case of the three-phase coil, the holder is equipped with three detecting elements.

An arranging pitch is not the same for the coil 5 and the permanent magnets 2. If both were the same, there would appear a moment in which the combined force of the thrust of each coil 5 is zero, resulting in a large thrust ripple, which leads to the cogging of the coil 5. With the arranging pitch of the coil 5 and the permanent magnets 2 deviated form each other, the coil 5 undergoes smooth movement with a reduced thrust ripple. In that case, electric current should be supplied successively to part of a plurality of coils 5. The timing of ON/OFF to supply electric current to each coil 5 and the direction of electric current are determined depending on the output of the hole element.

When current is supplied to the coil 5, it receives thrust in the longitudinal direction of the yoke 1 by the Fleming's rule, a mover (not shown) integrally provided with the coil 5 moves in the longitudinal direction of the yoke 1. When current is supplied to the coil 5 in an opposite direction, thrust in an opposite direction acts on coil 5, resulting in moving the mover in an opposite direction. Accordingly, current supply to the coil 5 and the direction of that current can be chosen to move the mover to the predetermined position. The strength of this thrust is proportional to current flowing through the coil 5.

Contrary to the above embodiment, the coil may be a stator, and the permanent magnets may be movers to achieve the same function. Though the coil 5 is disposed in the magnetic gap 3 in the above embodiment, as shown in FIG. 6, a linear motor may be free from a magnetic gap 3. In such a linear motor, the coil 5 is movable on permanent magnets 2 disposed on a yoke 1.

When current is caused to flow through the coil 5, Joule heat is generated, and when the temperature of the coil 5 is elevated to a level exceeding its heat resistance limit, the coil 5 is burned down. As a method preventing this problem, for instance, Japanese Patent Laid-Open No. 4-67763 proposes the mounting of a temperature-detecting element such as a thermistor, etc. to a coil. However, though a surface portion of the coil is well cooled by air-flowing effect, etc., heat is likely to be accumulated inside the coil, resulting in the tendency that the temperature of the coil is higher in an inner portion than in a surface portion. Because a temperature-detecting element such as a thermistor, etc. is mounted onto the coil surface, it is impossible to detect the temperature inside the coil. Accordingly, it has been found that the method disclosed in Japanese Patent Laid-Open No. 4-67763 fails to accurately detect the temperature at which the coil 5 is burned down. In addition, it suffers from the problem that the mounting of a thermistor, etc. onto the coil surface makes wiring, etc. more difficult.

To avoid such problems, there is a known method for generating a coil overheat signal when the product of I×T, in which I is a level of current flowing through a coil, and T is time in which the current flows, exceeds a predetermined value. As one example thereof, Japanese Patent Laid-Open No. 59-89517 proposes an electronic overcurrent relay for generating an overload signal for a time period of operation corresponding to the current level, when alternating current in a main apparatus exceeds a predetermined value. Japanese Patent Laid-Open No. 63-209420 proposes an electronic thermal relay having operation characteristics obtained by improving the electronic overcurrent relay of Japanese Patent Laid-Open No. 59-89517 in a range of a large current.

In general, an induction motor achieves the maximum speed in a steady operation, in which it is required to provide the maximum torque. Accordingly, it is necessary to detect overload to load variations in this state. Effective as an overload-detecting apparatus is an electronic overcurrent relay or an electronic thermal relay, with which I×T is calculated.

On the other hand, the maximum speed is achieved in a linear motor in a steady operation, and the speed can be kept with a relatively small current necessary for compensating deceleration by a running resistance in this state. The maximum thrust is required rather at the time of acceleration or deceleration, causing large current to flow through the linear motor. Accordingly, it is necessary to accurately detect the overheat of the coil by current measurement for a short period of time, during acceleration or deceleration at which large current flows for a short period of time, rather than in a steady operation in which the maximum speed is achieved.

Used in the control of a linear motor are a position deviation signal obtained by subtracting the feedback value of position information from the predetermined value of position information, and a speed deviation signal obtained by subtracting the feedback value of speed information from the predetermined value of speed information. In general, current in proportion to the position deviation signal and the speed deviation signal is supplied to a coil in a linear motor in a steady operation. However, when a mover has fallen into a full stop by accident in the course of movement, or when a mover has stopped, for instance, before reaching a predetermined stop position because of overload (particularly when it has stopped immediately before reaching the predetermined stop position), the level of current supplied to the coil is kept relatively low because of a small position deviation signal (position deviation), failing to restart the mover. With this current supply condition kept for a long period of time, a Joule heat is accumulated in the coil. If current supply were not stopped soon in this state, the coil would be overheated.

Though the conventional electronic overcurrent relay or electronic thermal relay have good operation characteristics in a range of a large current, they cannot properly detect the overheat of the coil when a relatively small current flows for a long period of time. If the predetermined value of overload-detecting current were made smaller to detect the overheat of a coil, even small current after reaching the predetermined speed would lead to the determination that the coil is overheated, resulting in trouble in the operation of the linear motor.

In the case of the linear motor comprising a multi-phase coil, as described above, a plurality of coils are arranged with deviations corresponding to an exciting period in the arrangement direction of the permanent magnets. For instance, in the case of a three-phase coil having at least three coils arranged in a stroke direction, the pitch of the coils is 120° relative to a period of a magnetic field (one magnetic field period with two magnets). The direction of a magnetic pole is detected by a means such as a magnetic field-detecting element, etc. To make it possible to switch coils through which current should flow and its direction, it is preferable to control the driving of the multi-phase coils independently.

However, in the conventional apparatus for protecting a linear motor, which has wiring via Y-connection or Δ-connection, for instance, in the case of three-phase coils, current is detected only in one or two phases among the three phases to mainly control the level of current. The detected level of current is also used as operation information for a protecting means. Therefore, a current level (effective value) of each phase differs depending on the deviations of a magnetic field, the impedance of each coil, etc. In some cases, an undetected phase may have a high current level, while a detected phase may have a low current level. In this case, excess current in the undetected phase leads to the overheat of the coil.

OBJECTS OF THE INVENTION

Accordingly, an object of the present invention is to provide an apparatus and a method for protecting a linear motor, which can accurately detect the overheat of a coil by the measurement of current in a short period of time during acceleration or deceleration in which large current flows in a short period of time, which do not detect the overheat of a coil in a state where small current flows after a mover has reached a predetermined speed, and which can detect the overheat of a coil when the mover has stopped in the course of movement, resulting in relatively small current flowing for a long period of time, whereby Joule heat is accumulated, and a linear motor equipped with such a protecting apparatus.

Another object of the present invention is to provide an apparatus and a method for protecting a linear motor comprising a multi-phase coil, which can detect current in all phases to prevent the overheat, and a linear motor comprising a multi-phase coil equipped with such a protecting apparatus.

DISCLOSURE OF THE INVENTION

The apparatus of the present invention for protecting a linear motor having a structure in which permanent magnets and a coil are subjected to relative movement, comprises (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, and (g) an overload-preventing means receiving said overload signal for controlling a driving means of said coil, thereby protecting said coil.

The method of the present invention for protecting a linear motor having a structure in which permanent magnets and a coil are subjected to relative movement, comprises the steps of (1) detecting current flowing through said coil, (2) calculating the squared value of the detected current every constant time $\Delta t$, (3) successively storing said squared values from the first one to the nth one, eliminating the first squared value when the (n+1)th squared value is input, and repeating the same operation subsequently, (4) calculating the total of n squared values, (5) comparing the total of said squared values with a reference value, (6) outputting an overload signal when said total has become larger than said reference value, and (7) controlling a driving means of said coil when said overload signal is received, thereby protecting said coil.

The linear motor of the present invention has a structure in which permanent magnets and a coil are subjected to relative movement, comprising a protecting apparatus comprising (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, (g) an overload-preventing means receiving said overload signal for controlling a driving means of said coil, thereby protecting said coil.

The apparatus for protecting a linear motor having a structure in which permanent magnets and a multi-phase coil are subjected to relative movement, comprises in each phase of said multi-phase coil, (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, and (g) an overload-preventing means receiving said overload signal for controlling a driving means, thereby protecting said multi-phase coil.

The method of the present invention for protecting a linear motor having a structure in which permanent magnets and a multi-phase coil are subjected to relative movement, comprises in each phase of said multi-phase coil the steps of (1) detecting current flowing through said coil, (2) calculating the squared value of the detected current every constant time $\Delta t$, (3) inputting said squared values to successively store said squared values from the first one to the nth one, eliminating the first squared value when the (n+1)th squared value is input, and repeating the same operation subsequently, (4) calculating the total of n squared values, (5) comparing the total of said squared values with a reference value, (6) outputting an overload signal when said total has become larger than said reference value, and (7) controlling a driving means of said coil when said overload signal is received, thereby protecting said multi-phase coil.

The linear motor of the present invention has a structure in which permanent magnets and a multi-phase coil are subjected to relative movement, comprising in each phase of said multi-phase coil a protecting means comprising (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, (g) an overload-preventing means receiving said overload signal for controlling a driving means, thereby protecting said multi-phase coil.

DESCRIPTION OF THE PREFERRED EMBODIMENTS

Figure 1:
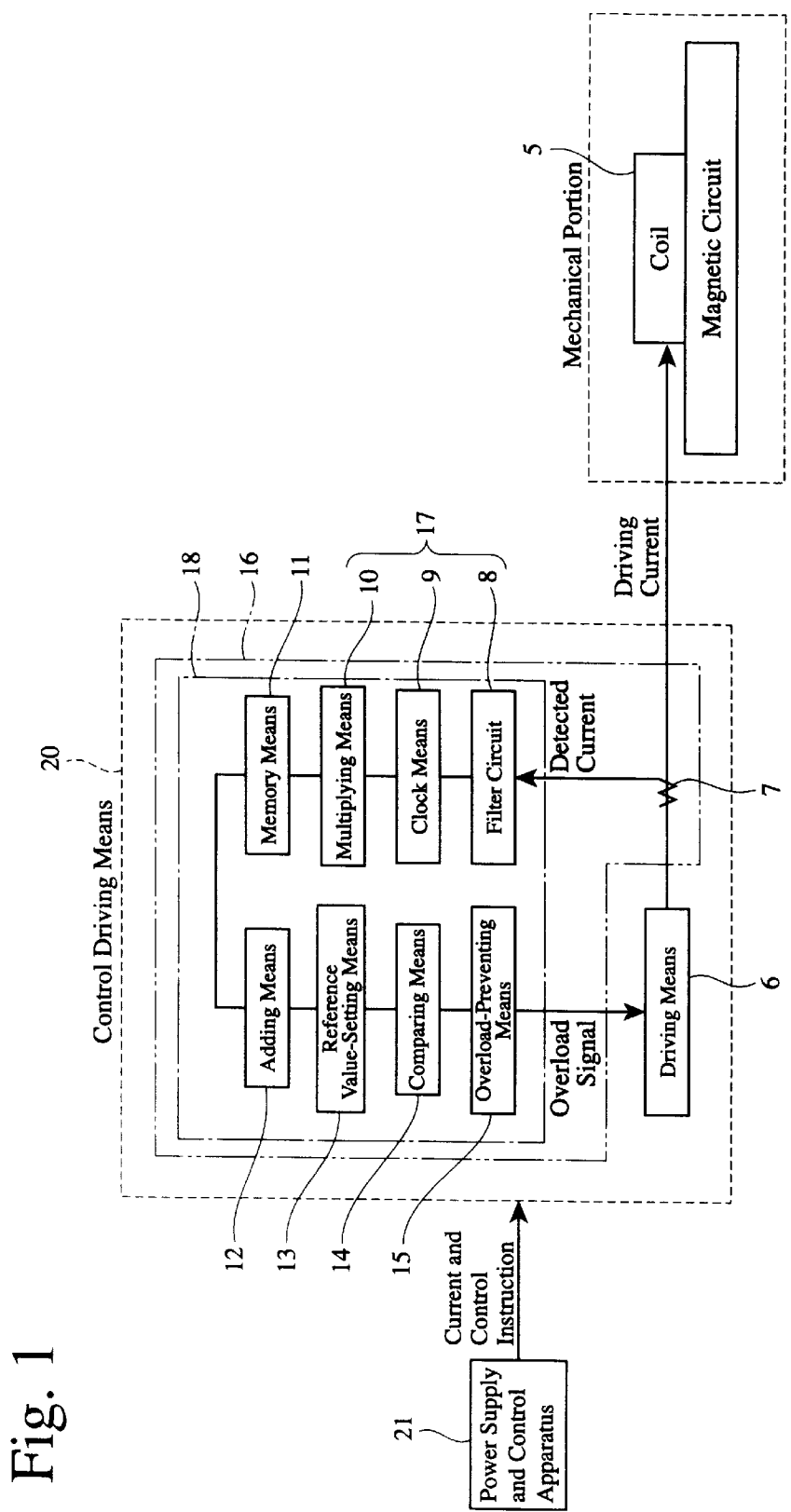
FIG. 1 is a block diagram showing an apparatus for protecting a linear motor according to one embodiment of the present invention.

FIG. 1 is a schematic view showing an apparatus for protecting a linear motor according to one embodiment of the present invention. A magnetic circuit and a coil 5 constitute a mechanical portion of the linear motor. A filter circuit 8, a clock means 9 and a multiplying means 10 constitute a squaring means 17. A squaring means 17, a memory means 11, an adding means 12, a reference value-setting means 13, a comparing means 14 and an overload-preventing means 15 constitute a memory/calculation means 18. A current-detecting means 7 and the memory/calculation means 18 constitute a protecting means 16. The protecting means 16 and a driving means 6 constitute a control driving means 20 in the linear motor.

A commercially available current transformer for instrument may be used as the current-detecting means 7. Usable as the filter circuit 8 is a commercially available circuit unit or a circuit unit customized for this linear motor.

Usable as the clock means 9, the multiplying means 10, the memory means 11, the adding means 12, the setting means 13, the comparing means 14 and/or the overload-preventing means 15 is a personal computer, a sequencer or a control/calculation means. When a personal computer or a sequencer is used, a program for functioning the clock means 9, the multiplying means 10, the memory means 11, the adding means 12, the setting means 13, the comparing means 14 and/or the overload-preventing means 15 is read by the personal computer or the sequencer.

Figure 2:
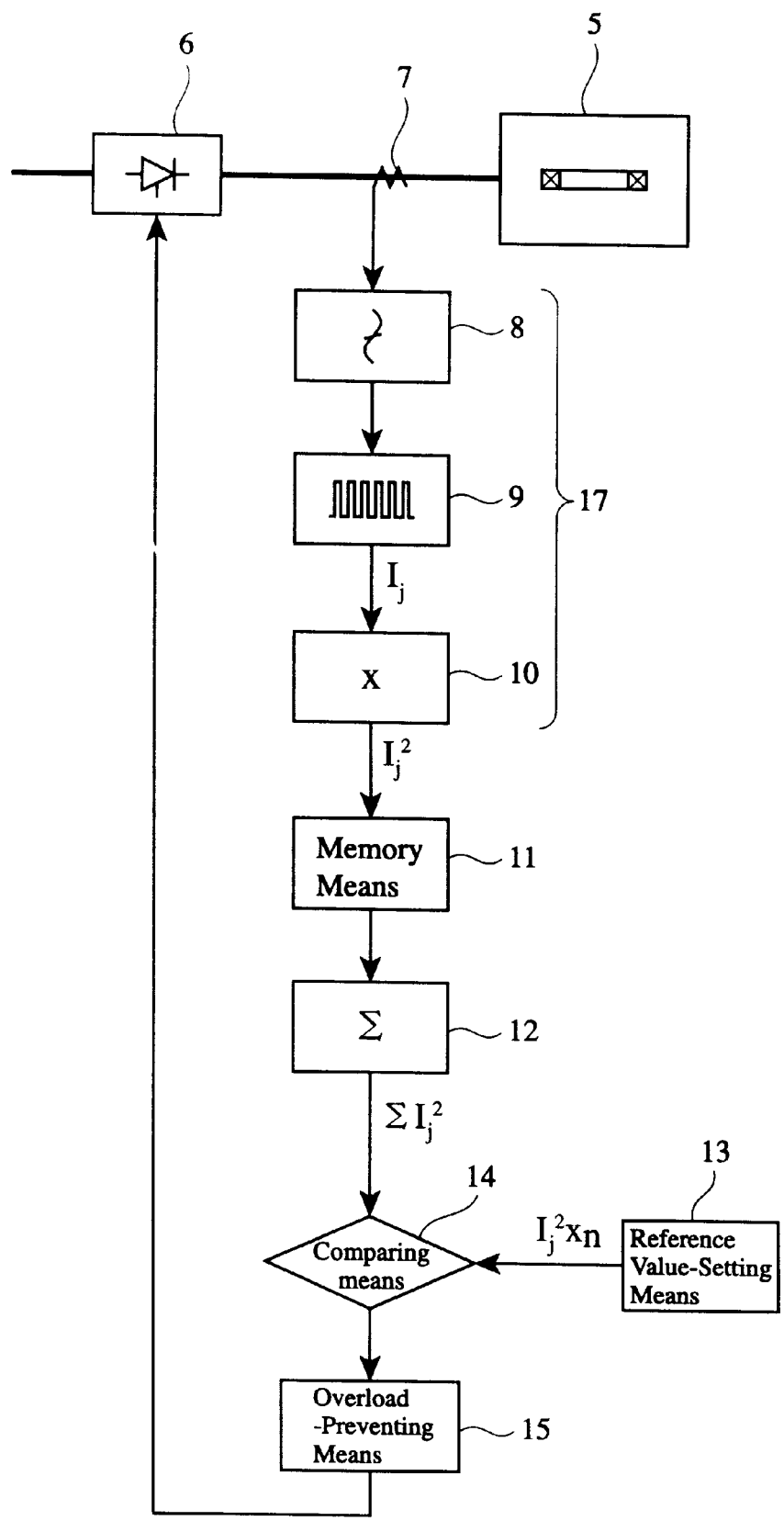
FIG. 2 is a block diagram showing a control driving means and a coil in the protecting means shown in FIG. 1.
Figure 3:
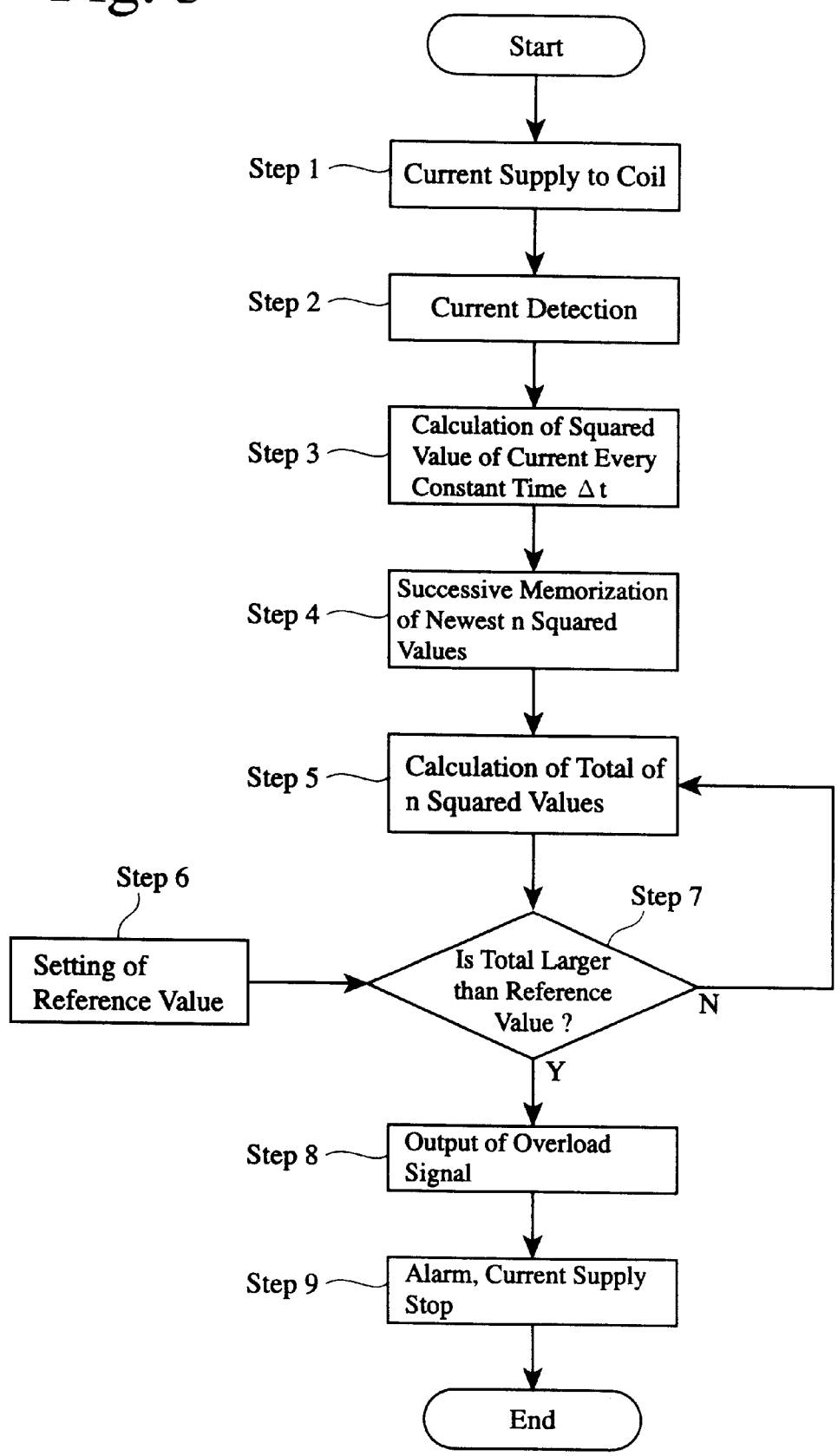
FIG. 3 is a flow chart showing the process of controlling the operation of the control driving means and the coil of FIG. 1.
Figure 4:
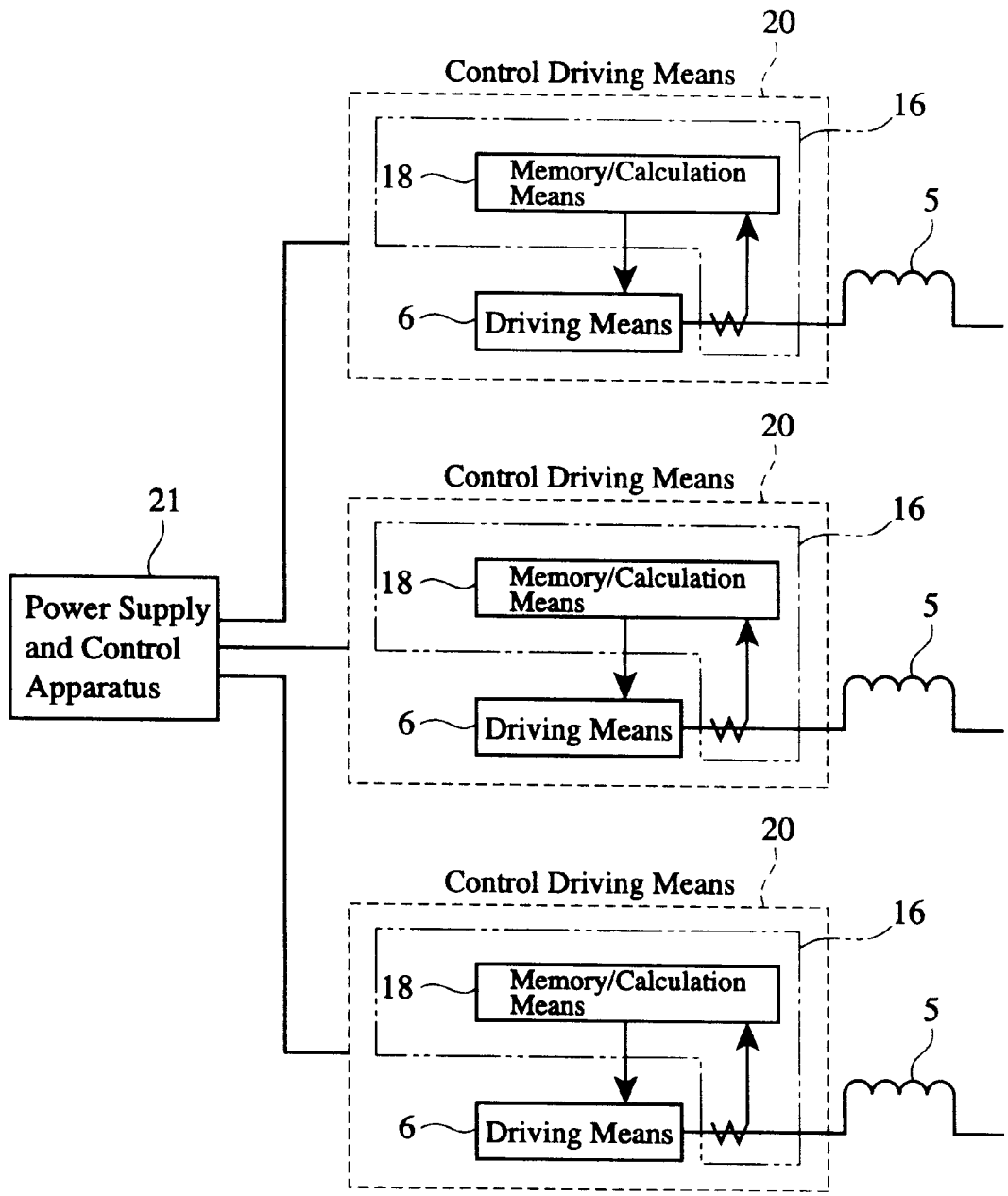
FIG. 4 is a block diagram showing a driving means and a protecting means in the linear motor comprising a three-phase coil according to a preferred embodiment of the present invention.
Figure 5:
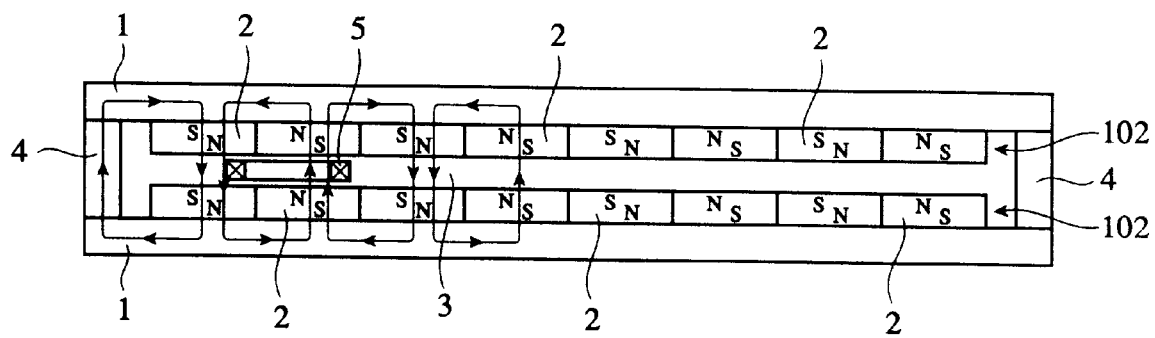
FIG. 5 is a schematic cross-sectional view showing one example of a mechanical portion of the linear motor.
Figure 6:
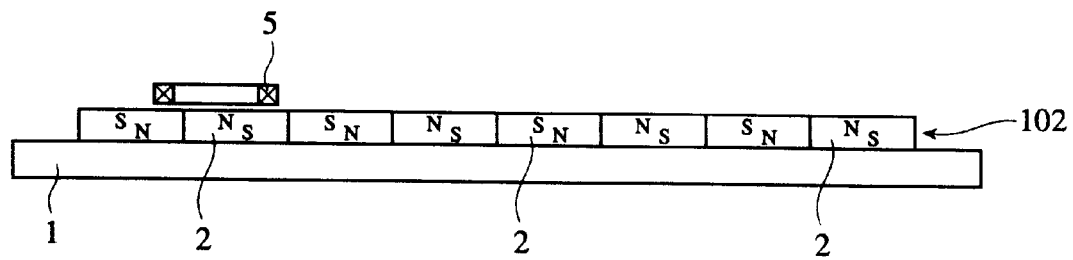
FIG. 6 is a schematic cross-sectional view showing another example of a mechanical portion of the linear motor free from a magnetic gap.

FIG. 2 is a flow chart showing the control of the control driving means and the coil 5 of FIG. 1, and FIG. 3 is a flow chart showing the control steps. FIG. 4 shows a driving means and a protecting means in the three-phase coil, linear motor according to a preferred embodiment of the present invention. Incidentally, the same portions as in FIGS. 5 and 6 are assigned the same reference numerals. Referring to FIGS. 1–4, the embodiment of the present invention will be explained in detail below.

(1) Step 1

A power supply and a control apparatus 21 provide current and control instruction to the control driving means 20, which in turn supplies a driving current to the coil 5.

(2) Step 2

The driving current detected by the current-detecting means 7 is supplied to the clock means 9 via a filter circuit 8.

(3) Step 3

Current $I_j$ is detected by the clock means 9 every predetermined variable time $\Delta t$. The squared value $I_j^2$ of the current $I_j$ is calculated by the multiplying means 10.

(4) Step 4 n squared values $I_j^2$ are input to the memory means 11 and memorized therein. When the (n+1)th squared value $I_j^2$ is input to the memory means 11, the first input squared value $I_j^2$ is removed. And when the (n+2)th squared value $I_j^2$ is input to the memory means 11, the second input squared value $I_j^2$ is removed. Subsequently, as the squared value $I_j^2$ are input to the memory means $I_j^2$ successively, the squared value $I_j^2$ are removed in an order from the oldest one. This process is repeated so that the newest n squared values $I_j^2$ are always stored in the memory means 11. Incidentally, n is a predetermined integer.

(5) Step 5

The total number of the stored squared values $I_j^2$ are calculated by an adding means 12. As shown in Table 1 below, the first output of the adding means 12 is $I_1^2+I_2^2+\ldots+I_n^2$, the second output after $\Delta t$ $I_2^2+I_3^2+\ldots+I_{n+1}^2$, and the third output after further $\Delta t$ is $I_3^2+I_4^2+\ldots+I_{n+2}^2$. Thus, the total of the newest n squared values $I_j^2$ are always output. Accordingly, the output of the adding means 12 is a sum of n squared values $I_j^2$ from before the time of $\Delta t \times n$ including the history of heat generation from the coil from before the time of $\Delta t \times n$. Therefore, the detection of the heat generation of the coil is more accurate than the conventional electronic overcurrent relay or electronic thermal relay for detecting overload current for a short period of time.

TABLE 1

| Output | Time Lapsed After First Output | Output Of Adding Means 12 |
|---|---|---|
| First | 0 | $I_1^2 + I_2^2 + \ldots + I_n^2$ |
| Second | $\Delta t$ | $I_2^2 + I_3^2 + \ldots + I_{n+1}^2$ |
| Third | $\Delta t \times 2$ | $I_3^2 + I_4^2 + \ldots + I_{n+2}^2$ |
| ... | ... | ... |
| k th | $\Delta t \times (k-1)$ | $I_k^2 + I_{k+1}^2 + \ldots + I_{n+k-1}^2$ |

(6) Step 6

A reference value-setting means 13 sets a reference value $I_s^2 \times n$, using a predetermined reference current level $I_s$ and n. This reference value $I_s^2 \times n$ is an example, and for instance, a reference value $A \times n$ may be obtained from predetermined values A and n, or a predetermined value B may be used as a reference value. The reference current level $I_s$ is preferably the maximum current level $I_{sb}$, at which the coil 5 is not overheated with equilibrium kept between the generation and dissipation of Joule heat at the coil 5. The relations of each current level are; current in the coil after the mover achieved the predetermined speed <$I_{sb}$<current in the coil after the mover has stopped in the course of movement<large current at the time of acceleration and deceleration. Even if current exceeding the current level $I_{sb}$ flows through the coil 5, overheating would not occur immediately as long as it is within a short period of time. Because large current during acceleration or deceleration flows only for a short period of time, the coil is not overheated.

(7) Step 7

The output (the total of $I_j^2$) of the adding means 12 and the reference value are input to the comparing means 14 for comparison.

(8) Step 8

When the output of the adding means 12 is larger than the reference value, it is determined that the driving current to the coil 5 is an overload, resulting in outputting an overload signal to an overload-preventing means 15. Based on the relations of the current level mentioned in the step 6, only current in the coil is detected after the mover has stopped in the course of movement to output an overload signal. On the other hand, there is no case in which current in the coil after the mover has reached the predetermined speed and large current during acceleration or deceleration are detected to output the overload signal.

(9) Step 9

The overload-preventing means 15 thus controls the driving means 6 to stop current supply to the coil 5, and issues an alarm if necessary. Thus, the coil 5 is protected.

Depending on the characteristics of the coil to be protected and the operation conditions of the linear motor, optimum $\Delta t$ is set by a clock means 9, and optimum n is set by the memory means 11, and further an optimum reference current level $I_s$ (or the above A or B) is set by a reference value-setting means 13. When a personal computer or a sequencer is used as the clock means 9, the memory means 11 and the reference value-setting means 13, a program stored thereby is properly prepared to set an optimum value of each parameter. Alternatively, when a control/calculation means is used as the clock means 9, the memory means 11 and the setting means 13, a setting means for the control/calculation means (for instance, variable resistor, digital counter, etc.) is properly adjusted to set an optimum value of each parameter. The optimum value of $\Delta t$ is usually 100 ms–5 seconds, and the optimum value of n is usually 50-100, though they are not restrictive.

As shown in FIG. 4, a linear motor having a three-phase coil comprises a driving means 6 and a protecting means 16 in each phase of the three-phase coil. Thus, current is detected in all three phases, and when there is excess driving current in either phase, an overload signal is output to an overload-preventing means 15, which controls the driving means 6 to stop current supply to the coil 5, and issues an alarm if necessary to protect the coil 5. In this case, current supply to the coil phase, in which there is no excess current, is of course stopped.

Though the present invention has been explained above referring to the drawings, the present invention is not restricted to the above embodiments and may be properly modified by taking functions, costs, and productivity, etc. into consideration. Though a linear motor comprising a three-phase coil is described as a linear motor comprising a multi-phase coil in the above embodiments, the linear motor may have multi phases other than three phases. In addition, the linear motor may be provided with alarm functions of turning on an anomaly-indicating light and an alarm buzzer and sending an anomaly-indicating signal to related parts when there is an overload, if necessary. Of course, the present invention is applicable to either one of movable coil-type linear motors and movable magnet-type linear motors.

As described above in detail, though the overheat of a coil is not detected when there is small current after the mover has reached the predetermined speed, or when there is large current at the time of acceleration and deceleration, the overheat of a coil is detected in the present invention when Joule heat is accumulated with relatively small current flowing for a long period of time by the stop of the mover in the course of its movement. In the case of a linear motor comprising a multi-phase coil, current flowing through the coil is detected in all phases. Therefore, the linear motor of the present invention is free from problems of the conventional apparatuses for protecting linear motors that excess current flows through the phase of the coil in which current is not detected, resulting in the overheat of the coil.

What is claimed is:

1. An apparatus for protecting a linear motor having a structure in which permanent magnets and a coil are subjected to relative movement, comprising (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, and (g) an overload-preventing means receiving said overload signal for controlling a driving means of said coil, thereby protecting said coil.

2. A method for protecting a linear motor having a structure in which permanent magnets and a coil are subjected to relative movement, comprising the steps of (1) detecting current flowing through said coil, (2) calculating the squared value of the detected current every constant time $\Delta t$, (3) successively storing said squared values from the first one to the nth one, eliminating the first squared value when the (n+1)th squared value is input, and repeating the same operation subsequently, (4) calculating the total of n squared values, (5) comparing the total of said squared values with a reference value, (6) outputting an overload signal when said total has become larger than said reference value, and (7) controlling a driving means of said coil when said overload signal is received, thereby protecting said coil.

3. A linear motor having a structure in which permanent magnets and a coil are subjected to relative movement, comprising a protecting apparatus comprising (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, (g) an overload-preventing means receiving said overload signal for controlling a driving means of said coil, thereby protecting said coil.

4. An apparatus for protecting a linear motor having a structure in which permanent magnets and a multi-phase coil are subjected to relative movement, comprising in each phase of said multi-phase coil, (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, and (g) an overload-preventing means receiving said overload signal for controlling a driving means, thereby protecting said multi-phase coil.

5. A method for protecting a linear motor having a structure in which permanent magnets and a multi-phase coil are subjected to relative movement, comprising in each phase of said multi-phase coil the steps of (1) detecting current flowing through said coil, (2) calculating the squared value of the detected current every constant time $\Delta t$, (3) inputting said squared values to successively store said squared values from the first one to the nth one, eliminating the first squared value when the (n+1)th squared value is input, and repeating the same operation subsequently, (4) calculating the total of n squared values, (5) comparing the total of said squared values with a reference value, (6) outputting an overload signal when said total has become larger than said reference value, and (7) controlling a driving means of said coil when said overload signal is received, thereby protecting said multi-phase coil.

6. A linear motor having a structure in which permanent magnets and a multi-phase coil are subjected to relative movement, comprising in each phase of said multi-phase coil a protecting means comprising (a) a means for detecting current flowing through said coil, (b) a multiplying means for calculating the squared value of the detected current every constant time $\Delta t$, (c) a memory means receiving said squared values for successively storing said squared values from the first one to the nth one, the first squared value being eliminated when the (n+1)th squared value is input, and the same operation being repeated subsequently, (d) an adding means for calculating the total of n squared values in said memory means, (e) a means for setting a reference value, which is to be compared with the total of said squared values, (f) a means for comparing the total of said squared values with said reference value for outputting an overload signal when said total has become larger than said reference value, (g) an overload-preventing means receiving said overload signal for controlling a driving means, thereby protecting said multi-phase coil.

* * * * *